United States Patent
Isoyama et al.

(10) Patent No.: US 6,680,946 B1
(45) Date of Patent: Jan. 20, 2004

(54) LAYER 3 FLOW-SWITCHING METHOD AND SYSTEM

(75) Inventors: Kazuhiko Isoyama, Tokyo (JP); Toshiya Aramaki, Tokyo (JP); Akira Arutaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/302,286

(22) Filed: Apr. 30, 1999

(30) Foreign Application Priority Data

Apr. 30, 1998 (JP) .......................................... 10-120916

(51) Int. Cl.⁷ ............................................. H04L 12/56
(52) U.S. Cl. ............................. 370/395.61; 370/395.65
(58) Field of Search .................... 370/395.5, 395.51, 370/395.52, 395.6, 395.61, 395.63, 395.64, 395.65

(56) References Cited

U.S. PATENT DOCUMENTS

| | | | | |
|---|---|---|---|---|
| 5,440,547 A | | 8/1995 | Esaki et al. ................ 370/60 |
| 5,548,589 A | | 8/1996 | Jeon et al. ................ 370/60.1 |
| 5,828,844 A | * | 10/1998 | Civanlar et al. ........... 709/228 |
| 5,903,559 A | * | 5/1999 | Acharya et al. ........... 370/355 |
| 5,953,338 A | * | 9/1999 | Ma et al. ............... 370/395.21 |
| 5,996,021 A | * | 11/1999 | Civanlar et al. ........... 709/238 |
| 6,009,097 A | * | 12/1999 | Han .................... 370/395.52 |
| 6,046,999 A | * | 4/2000 | Miki et al. ............. 370/395.52 |
| 6,058,429 A | * | 5/2000 | Ames et al. ............... 709/242 |
| 6,069,889 A | * | 5/2000 | Feldman et al. ............ 370/351 |
| 6,078,963 A | * | 6/2000 | Civanlar et al. ........... 709/238 |
| 6,097,722 A | * | 8/2000 | Graham et al. ......... 370/395.21 |
| 6,115,373 A | * | 9/2000 | Lea ........................ 370/355 |
| 6,130,889 A | * | 10/2000 | Feldman et al. ............ 370/397 |
| 6,167,051 A | * | 12/2000 | Nagami et al. ............. 370/397 |
| 6,185,213 B1 | * | 2/2001 | Katsube et al. ............ 370/397 |
| 6,188,689 B1 | * | 2/2001 | Katsube et al. ............ 370/389 |
| 6,256,310 B1 | * | 7/2001 | Kim et al. ............. 370/395.43 |
| 6,256,314 B1 | * | 7/2001 | Rodrig et al. ............. 370/401 |
| 6,317,431 B1 | * | 11/2001 | Hodgkinson et al. ..... 370/395.6 |
| 6,336,129 B1 | * | 1/2002 | Ise et al. ................. 709/201 |
| 6,343,322 B2 | * | 1/2002 | Nagami et al. ............. 709/227 |
| 6,343,326 B2 | * | 1/2002 | Acharya et al. ............ 709/238 |
| 6,414,939 B1 | * | 7/2002 | Yamato .................. 370/236.1 |
| 6,428,467 B1 | * | 8/2002 | Benderev ................... 600/30 |
| 6,466,578 B1 | * | 10/2002 | Mauger et al. .......... 370/395.3 |
| 6,466,985 B1 | * | 10/2002 | Goyal et al. .............. 709/238 |
| 2002/0159391 A1 | * | 10/2002 | Demizu .................. 370/235.1 |

FOREIGN PATENT DOCUMENTS

| | | |
|---|---|---|
| JP | 4-138739 | 5/1992 |
| JP | 5-199223 | 8/1993 |
| JP | 5-227155 | 9/1993 |
| JP | 6-318951 | 11/1994 |
| JP | 8-46630 | 2/1996 |
| JP | 9-55764 | 2/1997 |
| JP | 9-121214 | 5/1997 |

* cited by examiner

*Primary Examiner*—Douglas Olms
*Assistant Examiner*—Van Nguyen
(74) *Attorney, Agent, or Firm*—Foley & Lardner

(57) ABSTRACT

A method for transferring a series of layer-3 packets through an ATM network composed of a plurality of ATM switches is disclosed. An ingress gateway determines whether a packet flow has been registered and, when the flow has not been registered, determines a transfer route. A connection setup cell is transmitted to a next-hop ATM switch to ensure a connection dedicated to transfer of tho series of packets. Then, a series of packets is transferred to the next-hop ATM switch through the connection after the connection has been set up.

19 Claims, 11 Drawing Sheets

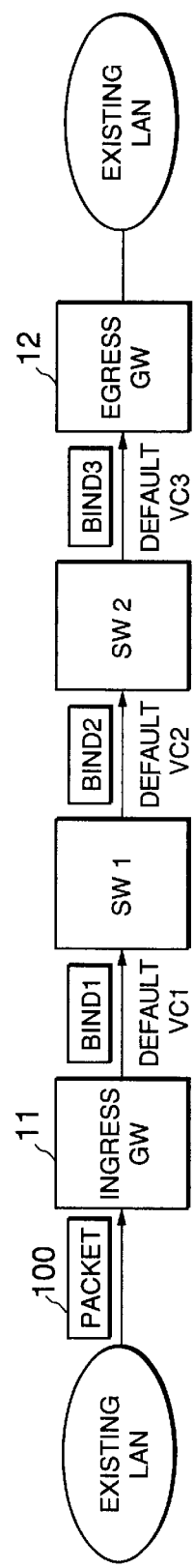
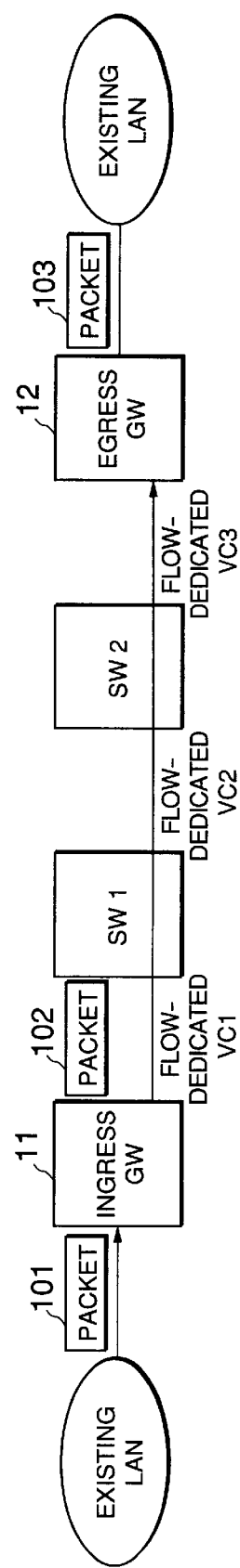

FIG.4A

```
S: MAIL FROM: <sender@ sendinghost. com>
R: 250
S: RCPT TO: <receiver@ receivinghost. edu>
R: 250
S: DATA
R: 354
S: DEAR RECEIVER;
R: THIS IS TO SHOW HOW SMTP WORKS.
S: BEST REGARDS.
S: SENDER
S: .
R: 250
S: QUIT
R: 221
```

FIG.4B

```
DEAR RECEIVER;
THIS IS TO SHOW HOW SMTP WORKS.
BEST REGARDS.
SENDER
```

FIG.10

| FLOW | NON-ATM INTERFACE NUMBER | ATM VPI/VCI | QOS | FLOW SWITCH SETUP TIME | REFRESH TIMER & FLAG | TRAFFIC |
|---|---|---|---|---|---|---|
| Flow#A | Ether#1 | VCC#1 | N | DATE#1 | TIME#1 | X |
| Flow#B | Ether#2 | VCC#2 | M | DATE#2 | TIME#2 | Y |

FIG.12

| FLOW | RECEIVING-SIDE VPI/VCI | TRANSMITTING-SIDE VPI/VCI | QOS | FLOW SWITCH SETUP TIME | REFRESH TIMER & FLAG |
|---|---|---|---|---|---|
| Flow#A | VCC#3 | VCC#5 | N | DATE#3 | TIME#3 |
| Flow#B | VCC#4 | VCC#6 | M | DATE#4 | TIME#4 |
| | | | | | |

LAYER 3 FLOW-SWITCHING METHOD AND SYSTEM

BACKGROUND OF THE INVENTION

1. Field of the Invention

The present invention relates to the method and system to transmit layer 3 packets on an Asynchronous Transfer Mode (ATM) network.

2. Description of the Related Art

Currently, on the network where Internet Protocol (IP) is widely used on the Internet, each router needs to compare the destination address of all packets sent by the source host with an internal routing table, decide the route to transmit the packets (routing process), and transmit the packets. These conventional routers conduct this routing process for each packet of a flow comprising a series of packets, and as a result, the total quantity of the packets to be processed is accumulated, which causes a decrease in throughput and an increase in transmitting delay time.

As an example of solving the above problem, a layer 3 switching method IFMP (Ipsilon Flow Management Protocol in Internet Engineering Taskforce Request for Comment: IETF RFC1953) is used. In the case where a network is composed of a first ATM switch (here, sending) and a second ATM switch (here, receiving), for example, IFMP is implemented as follows:

1. Each ATM switch detects a flow by looking at the layer 3 packets which belong to the same flow and are received at the default Virtual Channel (VC);
2. The second ATM switch sends a flow redirect message using the default VC to the first ATM switch in order to lot it use a VC allocated for that flow as a dedicated VC;
3. The first ATM switch begins sending the packets of the flow using that dedicated VC; and
4. After both sides (source and destination) setup the dedicated VCs specially for that flow, the packets are transferred through the dedicated VCs between the source and destination ATM switches However, the above-described IFMP has the following disadvantages.

1. The loads on each switch increase because each switch needs to have a flow detection function.
2. Redirection of flow on both source and destination ends needs to be completed before the switch can handle the flow. However, each switch will decide and request the flow-redirection to the source switch after it receives the first packet, which results in a long delay from the time when the first packet is received.
3. Because VPI and VCI will be allocated for each flow, the number of VPI and VCI Will become huge and the operation and administration of flow-redirection will be overload for switches.

SUMMARY OF THE INVENTION

An object of the present invention is to provide a method and system which can reduce a processing burden on each switch.

Another object of the present invention is to provide a method and system which can achieve the rapid flow switching of each switch.

According to the present invention, in a method for transferring a series of layer-3 packets received from a non-ATM network through an ATM network composed of a plurality of ATM switches, at an ingress gateway interfacing between the non-ATM network and the ATM network, the following stops are performed: a) determining whether a flow of the series of packets has been registered; b) determining a transfer route from a first packet of the series of packets according to a layer-3 routing protocol when the flow has not been registered; c) transmitting a connection setup message to a next-hop ATM switch of the ATM network according to the transfer route to ensure a connection dedicated to transfer of the series of packets; and d) transferring the series of packets received from the non-ATM network to the next-hop ATM switch through the connection after the connection has been set up.

At each of nodes receiving the connection setup message from an upstream node which is one of the ingress gateway and an adjacent ATM switch, the following steps are performed: determining a transfer route from the connection setup message according to a layer-3 routing protocol; transmitting a connection setup message to a next-hop node of the ATM network according to the transfer route to ensure a connection dedicated to transfer of the series of packets to the next-hop node; and transferring the series of packets received from the upstream node to the next-hop node through the connection after the connection has been set up.

At an ATM switch receiving the connection setup message, when the connection to the next-hop node is not set up yet, the series of packets are preferably transferred through a default connection to the next-hop node until the connection to the next-hop node has been set up.

Since the connection setup message is transmitted before a packet to be transferred on the layer 3 flow switching, the routing is allowed without assembling packets. The connection setup message is sent before actual packets arrive and the information conveyed by the connection setup message enables the routing of the actual packets. The actual packets will be transmitted on the allocated connection using hardware switching from the very first packet. Therefore, the processing of assembling packets can be removed and thereby the transfer delay is eliminated.

Further, there is no need to detect a flow on each switch. The ingress gateway is the only component that needs to detect the flow, and the switches on the way just need to recognize packets sent on the connection specified by the connection setup message as the flow. Therefore there is no need to detect the flow by looking at the port number and the line for each switch.

BRIEF DESCRIPTION OF THE DRAWINGS

FIG. 1A is a schematic diagram showing a dedicated-path setup operation in a first embodiment of a layer-3 flow switching method according to the present invention;

FIG. 1B is a schematic diagram showing a layer-3 flow switching operation using a dedicated path in the first embodiment;

FIG. 4A is diagram showing an example of mail sending sequence which is detected by a flow detector;

FIG. 4B is a diagram showing an example of an E-mail message sent by the sequence as shown in the FIG. 4A;

FIG. 10 is a diagram showing one example of a flow table on the gateway as shown in FIG. 9;

FIG. 12 is a diagram showing one example of a flow table on the ATM switch as shown in the FIG. 11.

DESCRIPTION OF THE PREFERRED EMBODIMENTS

As shown in FIGS. 1A and 1B, it is assumed for simplicity that an ATM network is composed of an ingress gateway 11 and an ingress gateway 12 from the ATM network to another existing LAN, which are connectable through switches SW1 and SW2 The ingress gateway 11 is connected to a non-ATM network such as an existing local-area network (LAN) conforming to IEEE802 or ITU-T recommendations and is an entrance node of the ATM network. The ingress gateway 11 receives a packet 100 from the existing LAN and detects that the packet is a part of a new flow.

When detecting a new flow, the ingress gateway 11 sends a connection setup cell (hereafter called BIND cell) BIND1 to a net-hop switch (here, the switch SW1) through a default virtual channel VC1 before it sends that flow packet to the next top switch. The BIND cell BIND1 has the flow identification (layer-3 source and destination address, layer-4 port number, etc.) and the VPI and VCI of a dedicated VC allocated for that flow.

When the switch SW1 has received the BIND cell BIND1 from the ingress gateway 11 through the default virtual channel VC1, the switch SW1 looks up the flow identification of the BIND cell BIND1 and performs layer-3 routing process. Then, the switch SW1 allocates a dedicated virtual channel VC2 to that flow, and transmits a BIND Cell BIND2 to the next hop switch (here, the switch SW2). The switch SW2 sends the BIND cell BIND3 to the next hop, that is, the egress gateway 12 in the same manner. In this way, a dedicated connection composed of the flow-dedicated virtual channels VC1–VC3 is set up between the ingress gateway 11 and the egress gateway 12.

The ingress gateway 11 transmits the flow packet 102 using the flow-dedicated VC1 after having sent the BIND cell BIND1. When the flow arrives at each switch, the flow-dedicated VC1–VC3 are already allocated, and each switch can use these flow-dedicated VCs for switching process from the very first packet 100.

Figure 2A:
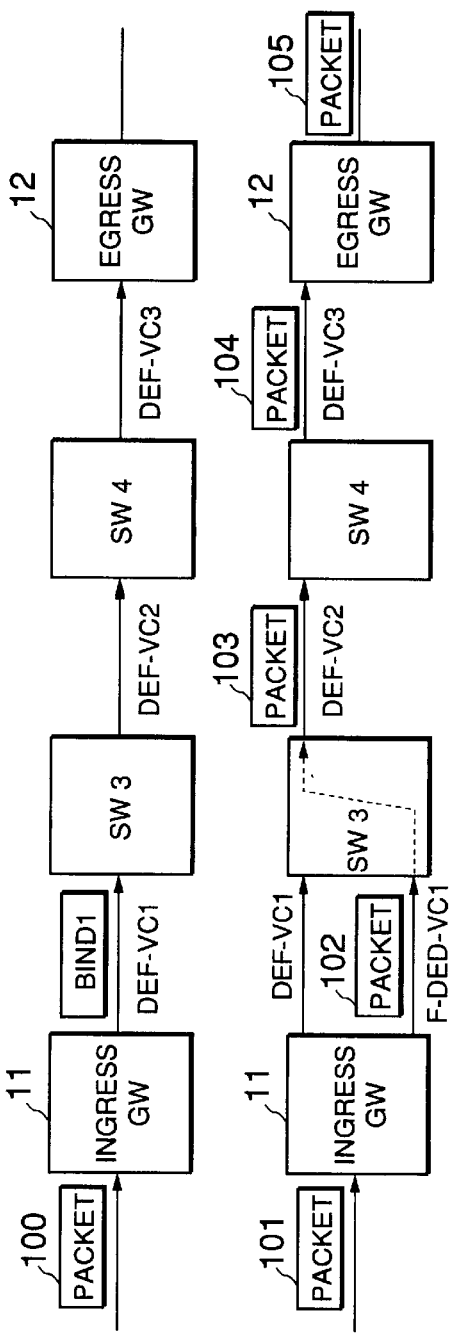
FIGS. 2A–2C are diagrams which show a dedicated-path setup operation according to the first embodiment in the case where a connection setup is delayed on a switch.

As shown in FIG. 2A, when detecting a new flow, as described above, the ingress gateway 11 sends the BIND cell BIND1 to a next-hop switch (here, the switch SW3) through a default virtual channel VC1 before it sends that flow packet to the next hop switch.

Figure 2B:
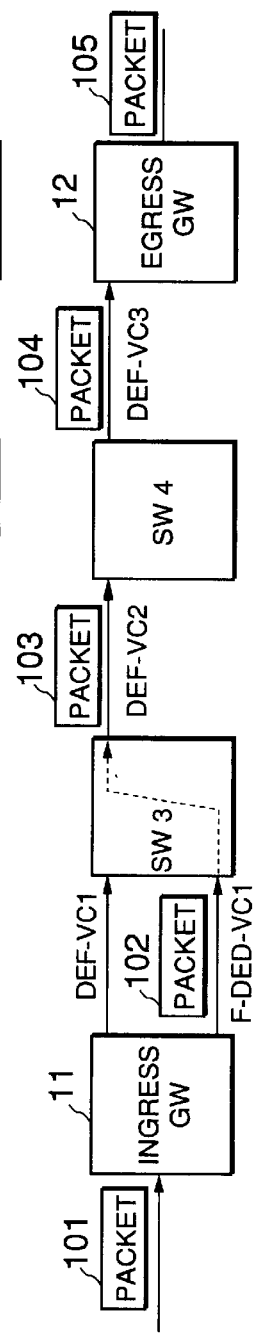

Referring to FIG. 2B, however, in the case where the flow-dedicated VC allocation process of the switches can not be completed before the packet 102, 103, 104 of that flow arrives, the packet will be transmitted using the default VC2. Alternatively, the packet will be buffered on the switch SW3 until the flow-dedicated VC2 has been allocated.

The switch SW3 performs the routing for the packet received through the flow-dedicated VC1 and transmits the packet to the next hop switch SW4 using the default VC2. The switch SW4 performs the routing for the packet received through the default VC2 and transmits the packet to the next hop using the default VC3.

Figure 2C:
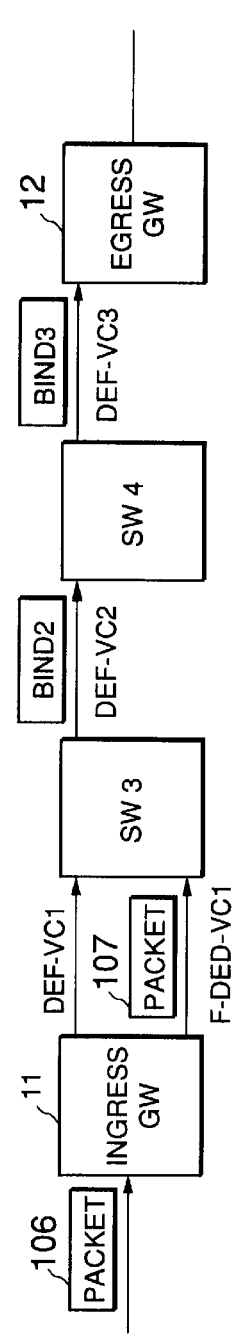
Figure 2D:
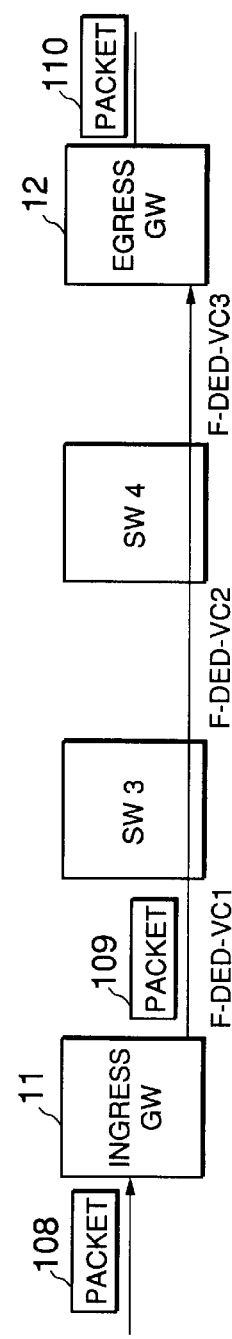
FIG. 2D is a schematic diagram showing a layer-3 flow switching operation using a dedicated path set up as shown in FIGS. 2A–2C.

As shown In FIGS. 2C and 2D, when the switch SW3 sends the BIND cell BIND2 to the switch SW4 and the switch SW4 sends the BIND cell BIND3 to the egress gateway 12, the flow-dedicated virtual channels VC1, VC2 and VC3 are set up to allow packets 108, 109, 110 to be transferred to the egress gateway 12.

Path Retaining

Next, retaining and releasing of a flow switching path will be explained referring to FIGS. 3A and 3B.

Figures 3A, 3B:
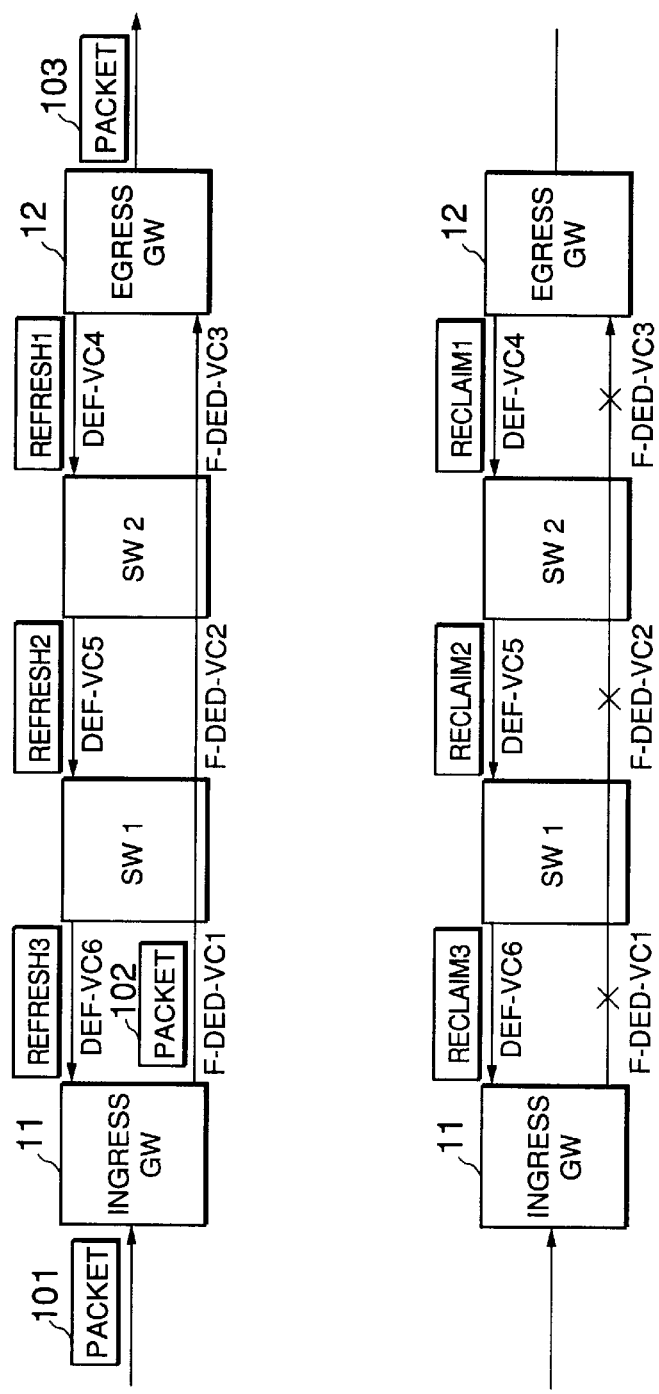
FIG. 3A is a schematic diagram showing a retaining operation of the flow switching path shown in the first embodiment.
FIG. 3B is a schematic diagram showing a releasing operation of the flow switching path in the first embodiment.

As shown in FIG. 3A, consider that the flow switching path composed of the flow-dedicated virtual channels F-DED-VC1 through F-DED-VC3 has been set from the ingress gateway 11 to the egress gateway 12, as described above. In this state, the egress gateway 12 monitors the traffic of the flow on the flow switching path F-DED-VC3.

As far as the apparent termination notification of flow like FIN/FIN-ACK of TCP (Transport Control Protocol) is not received, the egress gateway 12 periodically sends a path retaining cell REPRESH1 to the upstream switch (here, SW2) through the default VC4 in order to retain the flow switching path F-DED-VC3.

Similarly, the switch SW2, when receiving the cell REFRESH1 from the egress gateway 12, sends the path retaining cell REFRESH2 to the upstream switch SW1 using the default VC5 to retain the assigned flow switching path F-DED-VC2. Further, in the same manner, the switch SW1 and the ingress gateway 11 will retain the flow switching path F-DED-VC1.

Path Releasing

Referring to FIG. 3B, when the egress gateway 12 detects that there exists no traffic on the flow, or when it detects the apparent termination notification of the flow like FIN/FIN-ACK, then it stops sending the path retaining cell REFRESH1 and sends the path releasing cell RECLAIM1 to the upstream switch SW2 using the default VC4 to release the flow switching path F-DED-VC3.

The switch SW2, when receiving the path releasing cell RECLAIM1 from the egress gateway 12, sends the path releasing cell RECLAIM2 to the upstream switch SW1 to release the assigned flow switching path F-DED-VC2. Similarly, the switches SW2 and SW1 and the ingress gateway 11 release the flow switching paths F-DED-VC2 and F-DED-VC1. Alternatively, each switch may release the corresponding flow switching path when it did not receive the REFRESH cell during a predetermined time period.

Next, one example of the flow detection methods will be explained.

To send E-mail, we use the layer-4 protocol TCP. and the TCP header includes the port number 25 indicating that the upper protocol is SMTP (simple rail Transfer Protocol). The SMTP command and the reply will be sent using that port number 25.

Referring to FIG. 4A, the command from the source SMTP client is shown after "S:" while the reply from the destination SMTP server is denoted after "R:". In this figure, a transmit sequence is shown for the message as shown in FIG. 4B where an E-mail is sent from the sender, whose E-mail address is sender@sendinghost.com, to the receiver, whose E-mail address is receiver@receivinghost.edu. The command from the source SMTP client is first four characters and the reply message from the destination SMTP server is three digit numbers. In this invention, the gateway will detect RCPT command, for example, and if its receiver matches the registered address, then it recognize the new flow and it is possible to setup special connection (e.g. robust connection). Also, when QUIT is detected, any connection for that flow can be released.

Flow Integration

Figure 5A:
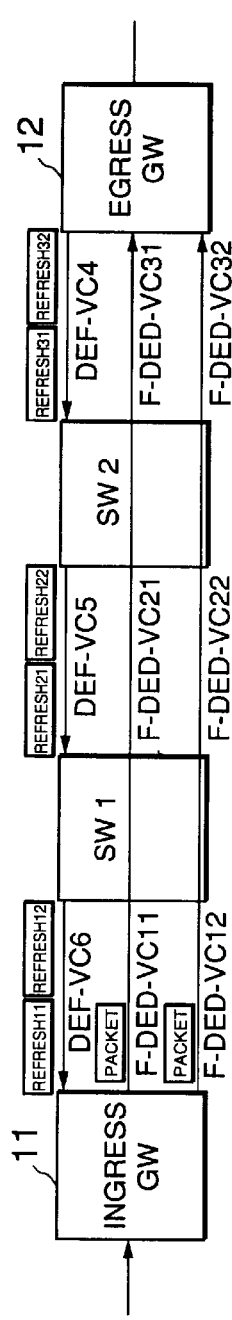
FIG. 5A is a schematic diagram showing a retaining operation of two flow switching paths in a second embodiment of a layer-3 flow switching method according to the present invention.

As shown in FIG. 5A, assuming that two flow-dedicated paths (F-DED-VC11, F-DED-VC21, F-DED-VC31) and (F-DED-VC12, F-DED-VC22, F-DED-VC32) have been set up between the ingress gateway 11 and the egress gateway 12, a flow integration operation will be described as a second embodiment of the present invention with reference to FIGS. 5A and 5B.

Referring to FIG. 5A, when the egress gateway 12 transmits the respective path retaining cells REFRESH31 and REFRESH32 corresponding to the flow-dedicated virtual channels F-DED-VC31 and F-DED-VC32 to the switch SW2. Its own ID is added to the path retaining cells REFRESH31 and REFRESH32. As described before, the corresponding path retaining cells are transferred through the switches SW2 and SW1 to the ingress gateway 11. Therefore, by looking at ID information included in the path retaining cells REFRESH11 and REFRESH12 received from the switch SW1, the ingress gateway 11 can identify an egress node of each flow-dedicated path as the egress gateway 12.

Figure 5B:
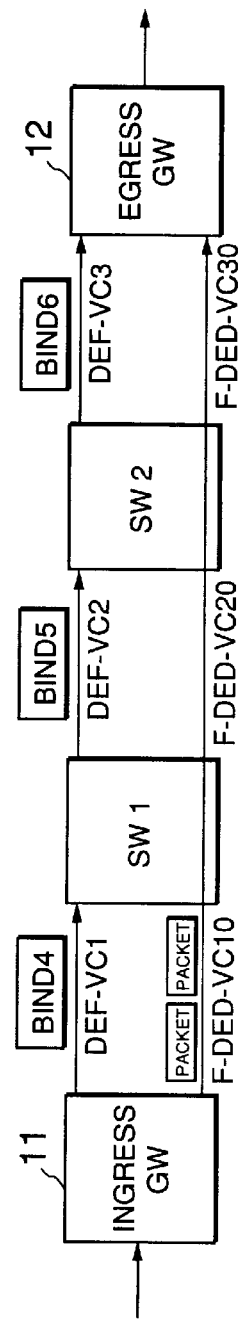
FIG. 5B is a schematic diagram showing a flow aggregation operation of the flow switching paths as shown in the FIG. 5A according to the second embodiment.

Referring to FIG. 5B. when detecting the multiple flows going through the egress gateway 12, the ingress gateway 11 transmits a BIND cell BIND4 to the destination side switch SW1 to integrate the flow-dedicated virtual channels F-DED-VC11 and F-DED-VC12 into a single flow-dedicated virtual channel F-DED-VC10.

Similarly, when receiving the BIND cell BIND4 from the ingress gateway 11, the switch SW1 transmits a BIND cell BIND5 to the destination side switch SW2 to integrate the flow-dedicated virtual channels F-DED-VC21 and F-DED-VC22 into a single flow-dedicated virtual channel F-DED-VC20. When receiving the BIND cell BIND5 from the switch SW1, the switch SW2 transmits a BIND cell BIND6 to the destination side egress gateway 12 to integrate the flow-dedicated virtual channels F-DED-VC31 and F-DED-VC32 Into a single flow-dedicated virtual channel F-DED-VC30.

In this manner, when the flow-dedicated paths (F-DED-VC11, F-DED-VC21, F-DED-VC31) and (F-DED-VC12, F-DED-VC22, F-DED-VC32) are formed between the same nodes, they can be integrated into a single flow-dedicated path (F-DED-VC10, F-DED-VC20, F-DED-VC30).

Connection QOS

In the flow switching path setup with connection QOS (Quality of Service) designated, the ingress gateway 11 sends the downstream switch SW1 the BIND cell BIND1 including connection QOS information to specify the connection QOS of the flow. When receiving such a BIND cell, each of the switches SW1 and SW2 and the egress gateway 12 sets up a flow switching path according to the designated connection QOS. The connection QOS Includes the followings.

Connection Priority

The connection priority may be set as follows:
1) If the line is so crowded that a new path cannot be setup, then a path is certainly allocated to that flow requesting a new path by releasing the path of another flow;
2) If there is an available VPI and VCI and a new path can be set up, then the new path is set up to be allocated to that flow; and
3) A path is set for the flow, but will be released when the line gets crowded.

Connection Robustness

Figure 6:
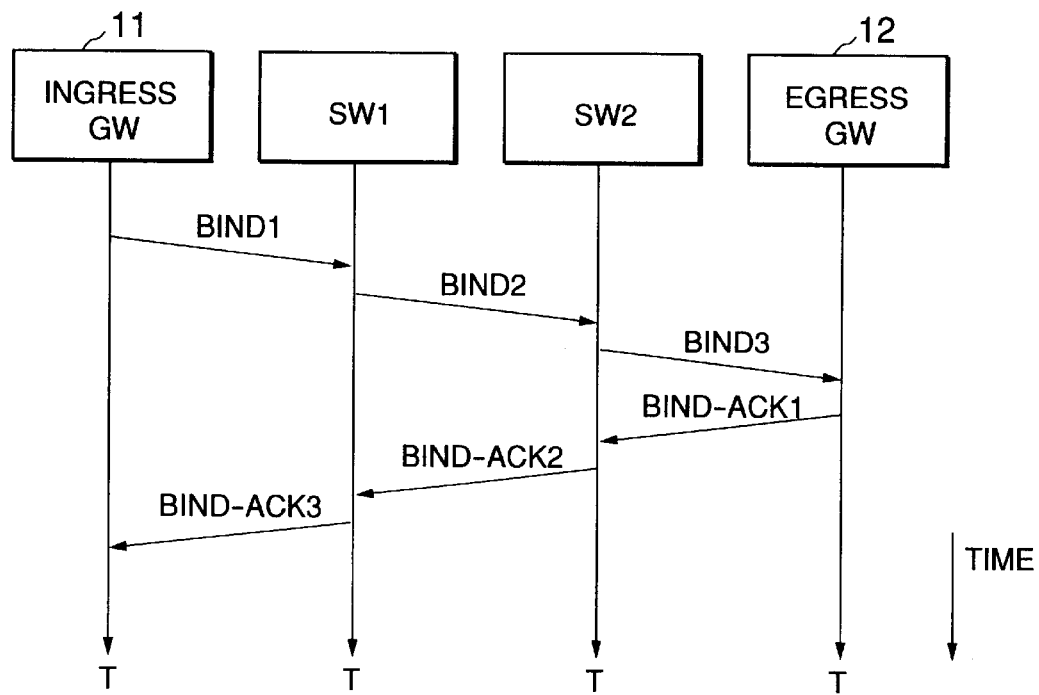
FIG. 6 is a schematic diagram showing a setup operation of a flow switching path with a first type of connection robustness in the first and second embodiments.

Referring to FIG. 6, when the BIND cell BIND3 arrives at the egress gateway 12 as described before and the connection is successfully set up between the ingress gateway 11 and the egress gateway 12, the egress gateway 12 sends an acknowledgement message BIND-ACK1 of the BIND cell BIND3 to the switch SW2. The switch SW2 sends an acknowledgement message BIND-ACK2 to the switch SW1 and the switch SW1 in turn sends an acknowledgement message BIND-ACK3 to the ingress gateway 11. Upon reception of the acknowledgement message BIND-ACK3, the ingress gateway 11 begins to transmit the flow through the flow-dedicated virtual channels F-DED-VC1, F-DED-VC2, and F-DED-VC3 as described before (see FIG. 1).

Figure 7:
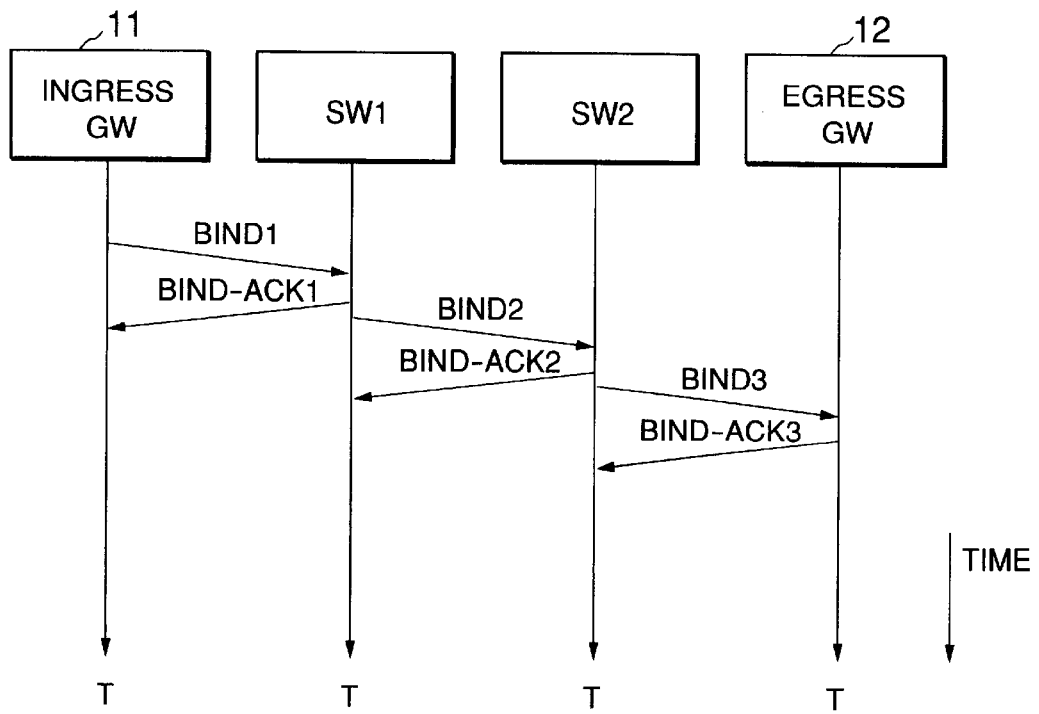
FIG. 7 is a schematic diagram showing a setup operation of a flow switching path with a second type of connection robustness In the first and second embodiments.

Referring to FIG. 7, each of the switches SW1 and SW2 and the egress gateway 12 sends an acknowledgement message back to an upstream node when receiving a BIND cell from the upstream node. More specifically, when receiving the BIND cell BIND1 from the ingress gateway 11, the switch SW1 sends the acknowledgement cell BIND-ACK1 back to the ingress gateway 11. It is the same with the switch SW2 and the egress gateway 12. At each node, upon reception of the acknowledgement message BIND-ACK, the flow is transmitted through the corresponding flow-dedicated virtual channel.

Figure 8:
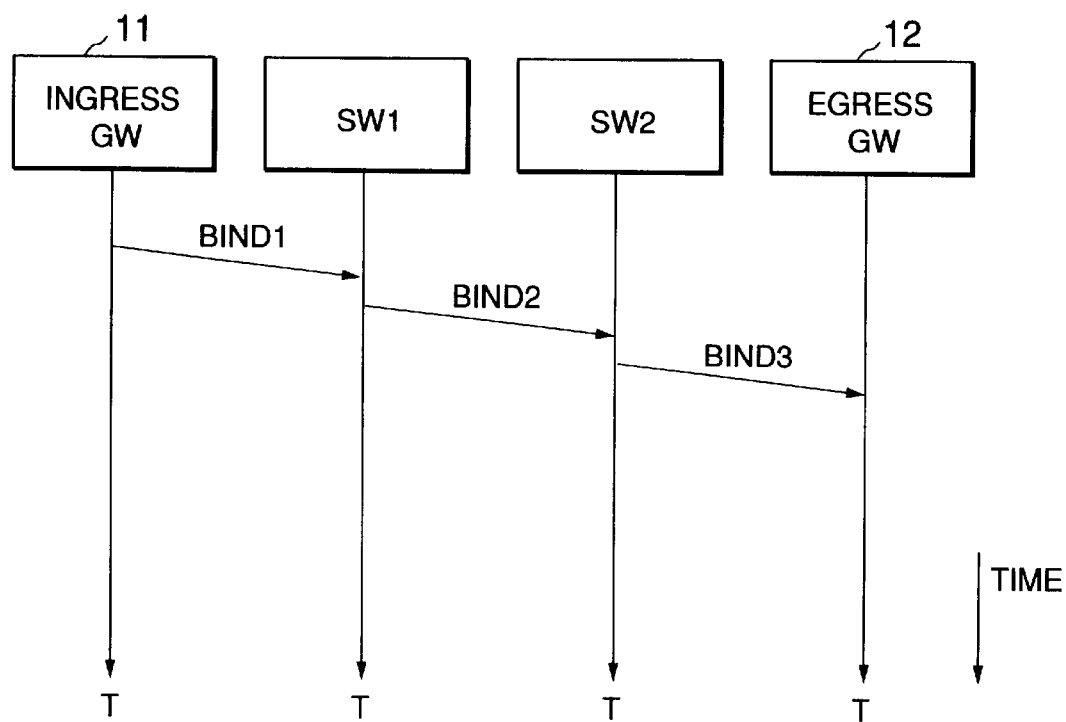
FIG. 8 is a schematic diagram showing a setup operation of a flow switching path with a third type of connection robustness in the first and second embodiments.

Referring to FIG. 8, just after each node has transmitted the BIND cell to the next hop node, it may begin transmitting the flow.

Gateway

Figure 9:
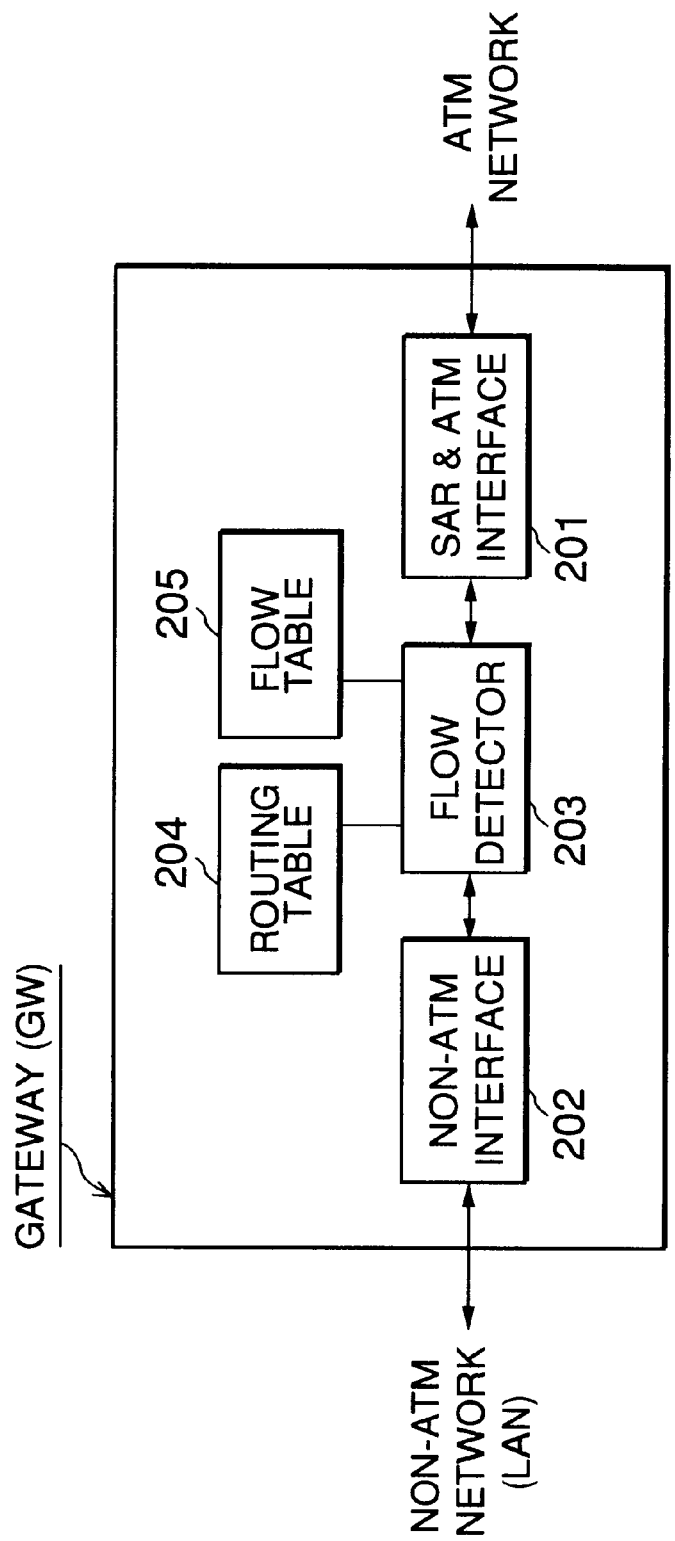
FIG. 9 is a schematic diagram showing the internal circuit of a gateway used in the first or second embodiment as described above.

Referring to FIG. 9, a gateway is connected to a non-ATM network such as LAN at one end and an ATM network at the other end. As will be described hereafter, the gateway works as the ingress gateway 11 and the egress gateway 12 as described above. The gateway is provided with a SAR (Segmentation and Reassembly) and ATM interface 201 to the ATM network and a non-ATM interface 202 to the non-ATM network. A flow detector 203 is connected to the ATM interface 201 and the non-ATM interface 202 to perform the flow detection and control using a routing table 204 and a flow table 205.

Referring to FIG. 10, the flow table 205 has the following fields: flow name, non-ATM interface number, ATM VPI/VCI, QOS, flow switch setup time, refresh timer and flag, and the amount of traffic.

When receiving a packet from the non-ATM network, the gateway works as the ingress gateway 11, and the packet is passed from the non-ATM interface 202 to the flow detector 203. The flow detector 203 checks the received packet whether it belongs to the registered flow or not by referring to the flow table 205.

If the packet does not belong to any existing flow, the flow detector 203 searches the routing table 204 for the VP/VC of a next-hop node in the ATM network and secures the VP/VC of the ATM network. Thereafter, the searched VP/VC of the ATM network is registered as a new flow onto the flow table 205. Then, as described before, the BIND cell is transmitted to the next-hop node (here, switch SW1) and the packets are transferred using the secured VP/VC which is the flow-dedicated virtual channel F-DED-VC.

On the other hand, if the packet belongs to an existing flow registered in the flow table 205, the packets are transferred using the registered ATM VP/VC. As needed by the charging system and the like, traffic (the number of packets, the total number of words, the total number of bytes, and the total number of bits of transferred packets, etc.) is measured and the flow table 205 is updated depending on the measurement.

When receiving the path retaining cell REFRESH from the ATM network, the flow detector 203 resets the refresh timer of the flow specified by the path retaining cell REFRESH in the flow table 205. Therefore, the flow-dedicated VC is retained until a timeout occurs at the refresh timer.

Contrarily, when the path releasing cell RECLAIM has been received from the ATM network or when the refresh timer of the flow table 205 has been timed out, the flow entry is discarded from the flow table 205.

On the other hand, when receiving a packet from the ATM network, the gateway works as the egress gateway 12. When receiving the BIND cell from ATM network, the SAR and ATM interface 201 passes the BIND cell to the flow detector 203. The flow detector 203 searches the routing table 204 for the destination shown by the BIND cell, and adds the flow to the flow table 205. After this process, the packets of the flow from ATM network will be transmitted to the non-ATM network using the flow table 205.

In the same time, the flow detector 203 measures the traffic of the flow and updates the flow table 205. For the flow that still has traffic, it sends the path retaining cell REFRESH and resets the refresh timer of the flow table 205 before the timer times out. It there is no traffic of the flow for a predetermined time period and the refresh timer times out, it sends the path releasing cell RECLAIM and discards the entry from the flow table 205.

The functions of the ingress gateway 11 and the egress gateway 12 can co-exist on the same gateway.

ATM Switch

Figure 11:
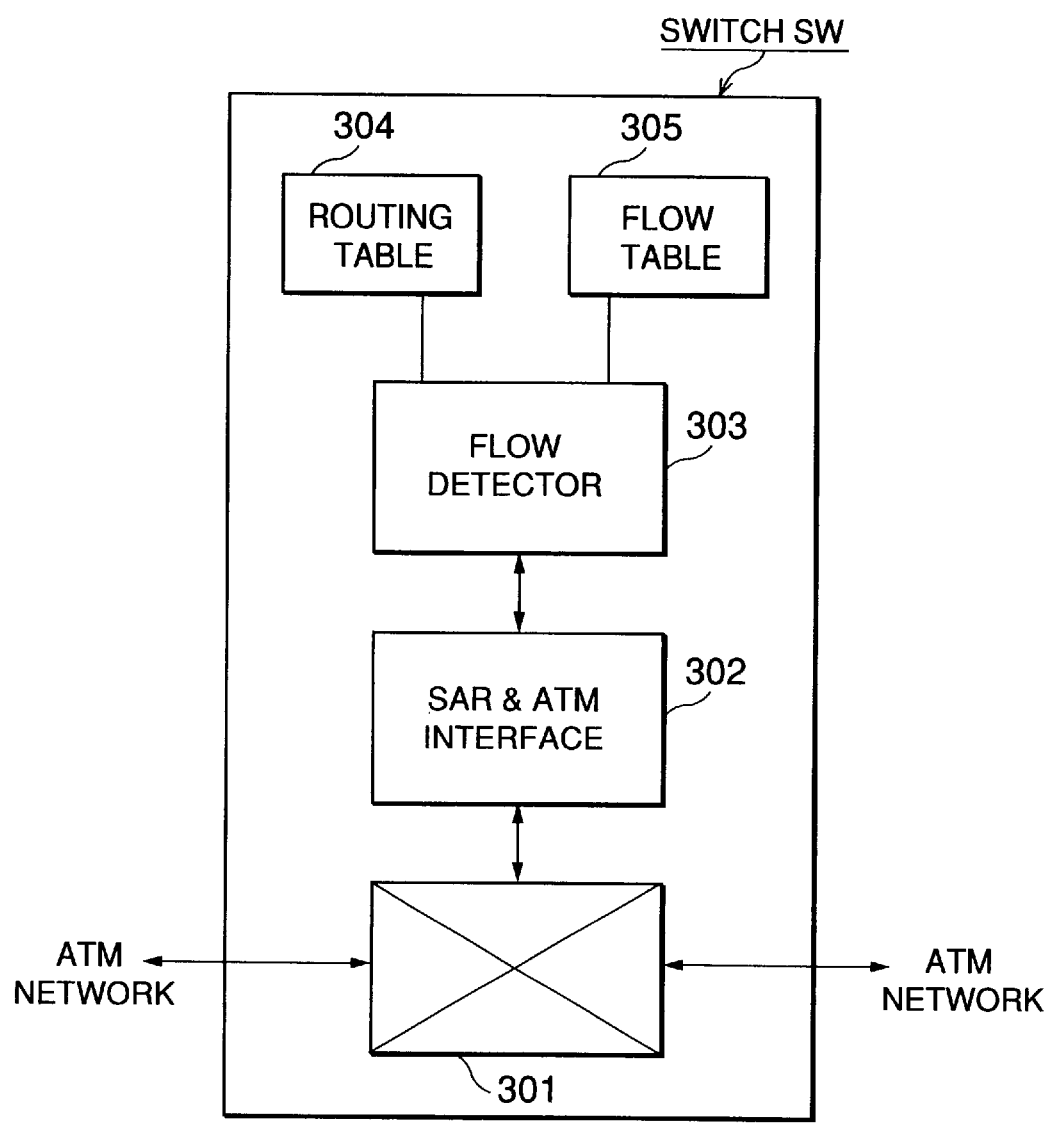
FIG. 11 is a schematic diagram showing the internal circuit of a ATM switch used in the first or second embodiment as described above.

Referring to the FIG. 11, an ATM switch is provided with a cell switch 301 which performs switching of receive cells from the ATM network The cell switch 301 is connected to a SAR and ATM interface 302. which is further connected to a flow detector 303. The flow detector 303 performs the flow detection and control using a routing table 304 and a flow table 305.

Referring to FIG. 12, the flow table 305 has the following fields: flow name, receiving-side VPI/VCI, transmitting-side VPI/VCI, QOS, flow switch setup time, and refresh timer and flag.

The BIND cell received from ATM network is switched by the cell switch 301 to the SAR & ATM interface 302, and the SAR & ATM interface 302 passes the BIND cell to the flow detector 303. The flow detector 303 searches the routing table 304 for the destination shown by the BIND cell, and allocates the VP/VC to the next-hop node of the ATM network, and sets up the cell switch 301 to switch the VPI/VCI shown by the BIND cell to the VPI/VCI allocated. After this process, the packets of the flow from ATM network will be switched by the cell switch 301 and transmitted to the next-hop node of the ATM network.

When receiving the path retaining cell REFRESH from the downstream ATM network. the refresh timer of that flow on the flow table 305 is reset and the path retaining cell REFRESH for the flow is sent to the upstream ATM network. Also, when the path releasing cell RECLAIM has been received from the downstream ATM network or when the refresh timer of that flow on the flow table 305 has been timed out, the entry of that flow is discarded from the flow table 305, and the path releasing cell RECLAIM for the flow is sent to the upstream ATM network.

Charging System

In the network system according to the present invention, the following charging methods may be employed.

1) Charging by the amount of connection time:

On the egress gateway 12, the length of time is calculated for each flow from the time when the connection is set up and the time when the flow in deleted from the flow table 205 (see FIG. 10). The connection service charges by the amount of calculated connection time.

2) Charging by the amount of traffic:

On the egress gateway 12, the connection service charges by the amount of traffic for each flow in the flow table 205. The dimension of the traffic may be the number of passed packets, the total number of words, the total number of bytes and the total number of bits of the passed packets.

3) Charging by the amount of traffic modified by lost packets:

Based on the above charging method 2), the number of lost packets in the ATM network is obtained by calculating the difference between the amount of traffic on the egress gateway 12 and that on the ingress gateway 11. The service charges by the amount of the traffic revised by the number of lost packets.

4) Charging by QOS:

Setting the rate on each connection QOS, and the service charges by the QOS used by the flow.

5) Charging by the amount of connection time and QOS

The connection service charges by setting the rate for connection time calculated in the charging method 1) on each connection QOS.

6) Charging by QOS and the amount of traffic on the egress gateway 12;

The connection service charges by setting the rate for traffic obtained by the charging method 2) on each connection QOS.

7) Charging by QOS and the amount of traffic on the egress gateway 12 and the ingress gateway 11;

The connection service charges by the amount of the traffic revised by the number of lost packets obtained by the charging method 39.

ADVANTAGES

According to the present invention, the following advantages can be obtained by using a BIND cell transmitted before a packet to be transferred on the layer 3 flow switching 1) The routing is allowed without assembling packets. The BIND cell is sent before actual packets arrive and the information conveyed by the BIND cell enables the routing of the actual packets. The actual packets will be transmitted on the allocated VC using hardware switching from the very first packet, and this enables the routing without assembling packets. Therefore, the processing of assembling packets can be removed and thereby the transfer delay is eliminated.

2) There is no need to detect a flow on each switch. The ingress gateway is the only component that needs to detect the flow, and the switches on the way just need to recognize packets sent on the VP/VC specific in the BIND cell as the flow Therefore, there is no need to detect the flow by looking at the port number and the line for each switch.

3) The switching is allowed from the first packet. At the time when the first packet is arrived on each switch, the switching path offered by the VC dedicated to that flow is already setup, and each switch can perform packet switching from the very first packet.

4) Connection QOS can be designated. The QOS can be realized on the whole ATM network by adding connection QOS information to the BIND cell going from the ingress gateway 11 to the egress gateway 12.

5) Flexible charging system can be set. With a combination of the connection priority, the connection robustness, the traffic monitoring on the egress gateway 12 and the traffic monitoring on the ingress gateway 11, the flexible charging system can be set.

6) The load of keeping flow switching path on each switch is reduced. Only the egress gateway 12 monitors the traffic of the flow, and decides whether it retains the flow switching path or releases it. Other switches just need to follow the REFRESH or RECLAIM message received from the downstream switch and retain or release the flow switching path. Therefore, each switch is burdened with reduced traffic monitoring.

7) A flow switching path is automatically released in case of accident. When the flow does not arrive the egress gateway 12 due to routing loop or line failure, the REFRESH cell to retain the path is not sent out. Therefore, the flow-dedicated path will be automatically released when a timeout occurs.

8) A flow integration can be performed using the information on the ingress gateway. By putting the ID of the egress gateway 12 on the REFRESH cell, the ingress gateway 11 can identify the egress gateway, which sent the flow into the network. When the ingress gateway 11 detects the multiple paths are set to the same the egress gateway 12, it can send these flows through a single VC.

What is claimed is:

1. A method for transferring a series of layer-3 packets received from a non-ATM network through an ATM network composed of a plurality of ATM switches, comprising the steps of:
   at an ingress gateway interfacing between the non-ATM network and the ATM network,
   a) determining whether a flow of the series of packets has been registered;
   b) determining a transfer route from a first packet of the series of packets according to a layer-3 routing protocol when the flow has not been registered;
   c) transmitting a connection setup message to a next-hop ATM switch of the ATM network according to the transfer route to ensure a connection dedicated to transfer of the series of packets; and
   d) transferring the series of packets received from the non-ATM network to the next-hop ATM switch through the connection after the connection has been set up,
   e) monitoring the flow of the series of packets received through the connection at an egress gateway to (1) determine wheter to retain or release the connection; and (2) affecting retention and release of said connection, and wherein
   at each of nodes receiving the connection setup message from an upstream node which is one of the ingress gateway and an adjacent ATM switch;
   determining a transfer route from the connection setup message according to a layer-3 routing protocol;
   transmitting a connection setup message to a next-hop node of the ATM network according to the transfer route to ensure a connection dedicated to transfer of the series of packets to the next-hop node; and
   transferring the series of packets received from the upstream node to the next-hop node through the connection after the connection has been set up; and
   wherein, at said egress gateway which has received the connection setup message, affecting retention and release of said connection by:
   transmitting a connection retaining message to an upstream adjacent node using a default connection at intervals of a predetermined time period to retain the connection dedicated to transfer of the series of packets, when it is determined that the flow continues; and
   transmitting a connection releasing message to the upstream adjacent node using the default connection to release the connection dedicated to transfer of the series of packets, when it is determined that the flow is terminated.

2. The method according to claim 1, wherein when the series of packets has been completely transferred, it is determined that the flow is terminated.

3. The method according to claim 1, wherein when the flow has been interrupted for a time period longer than the predetermined time period, it is determined that the flow is terminated.

4. The method according to claim 1, wherein the connection retaining message conveying identification information of the egress gateway,
   at the ingress gateway,
   determining whether a plurality of connections have the egress gateway, by looking at the identification information of the connection retaining message;
   transmitting a connection setup message to the next-hop ATM switch to integrate the plurality of connections to produce a single connection to the egress gateway when the plurality of connections have the same egress gateway; and
   transferring the packets transferred through the plurality of connections to the next-hop ATM switch through the single connection after the single connection has been set up.

5. A system comprising:
   an ATM network composed of a plurality of ATM switches;
   a first gateway interfacing between the ATM network and a first non-ATM network; and
   a second gateway interfacing between the ATM network and a second non-ATM network,
   wherein each of the first and second gateways comprises:
   a first routine table;
   a first flow table for registering a flow of a series of layer-3 packets;
   a first controller for determining whether a flow of the series of packets has been registered by referring to the flow table, determining, a transfer route from a first packet of the series of packets by referring to the routine table when the flow has not been registered in the flow table, registering the flow in the flow table, transmitting a connection setup message to a next-hop ATM switch of the ATM network according to the transfer route to ensure a connection dedicated to transfer of the series of packets, and transferring the series of packets received from the non-ATM network to the next-hop ATM switch through the connection after the connection has been set up; and said first controller, after receiving the connection setup message (1) monitors the flow of the series of packets received through the connection and (2) affects retention and release of said connection; and wherein each of ATM switches comprises:
a second routing table;
a second flow table for registering a flow of a series of layer-3 packets; and
a second controller for determining a transfer route from the connection setup message by referring to the second routing table, transmitting a connection setup message to a next-hop node of the ATM network according to the transfer route to ensure a connection dedicated to transfer of the series of packets to the next-hop node, and transferring the series of packets received from the upstream node to the next-hop node through the connection after the connection has been set up.

6. The system according to claim 5, wherein when the connection to the next-hop node is not set up yet, the second controller transfers the series of packets through a default connection to the next-hop node until the connection to the next-hop node has been set up.

7. The system according to claim 5, wherein the step of affecting retention and release includes: transmitting a connection retaining message to an upstream adjacent node using a default connection at intervals of a predetermined time period to retain the connection dedicated to transfer of the series of packets when it is determined that the flow continues, and transmitting a connection releasing message to the upstream adjacent node using the default connection to release the connection dedicated to transfer of the series of packets when it is determined that the flow is terminated.

8. The system according to claim 7, wherein when the series of packets has been completely transferred, the first controller determines that the flow is terminated.

9. The system according to claim 7, wherein when the flow has been interrupted for a time period longer than the predetermined time period, the first controller determines that the flow is terminated.

10. The system according to claim 7, wherein the connection retaining message conveying identification information of the egress gateway, and the first controller determines whether a plurality of connections have the egress gateway by looking at the identification information of the connection retaining message, transmitting a connection setup message to the next-hop ATM switch to integrate the plurality of connections to produce a single connection to the egress gateway when the plurality of connections have the same egress gateway, and transferring the packets transferred through the plurality of connections to the next-hop ATM switch through the single connection after the single connection has been set up.

11. A system comprising:
an ATM network composed of a plurality of ATM switches;

a first gateway interfacing between the ATM network and a first non-ATM network; and
a second gateway interfacing between the ATM network and a second non-ATM network,
wherein each of the first and second gateways comprises:
a first routing table;
a first flow table for registering a flow of a series of layer-3 packets;
a first controller for determining whether a flow of the series of packets has been registered by referring to the flow table, determining a transfer route from a first packet of the series of packets by referring to the routing table when the flow has not been registered in the flow table, registering the flow in the flow table, transmitting a connection setup message to a next-hop ATM switch of the ATM network according to the transfer route to ensure a connection dedicated to transfer of the series of packets, and transferring the series of packets received from the non-ATM network to the next-hop ATM switch through the connection after the connection has been set up; and
said first controller, after receiving the connection setup message (1) monitors the flow of the series of packets received through the connection and (2) affects retention and release of said connection; and
wherein the first controller operates by:
determines whether a flow of the series of packets has been registered by referring to the flow table,
determining a transfer route from a first packet of the series of packets by referring to the routing table when the flow has not been registered in the flow table,
registering the flow in the flow table with a required connection QOS (Quality of Service),
transmitting a connection setup message conveying the connection QOS to a next-hop ATM switch of the ATM network according to the transfer route to ensure a connection with the connection QOS dedicated to transfer of the series of packets, and
transferring the series of packets received from the non-ATM network to the next-hop ATM switch through the connection after the connection with the connection QOS has been set up.

12. The system according to claim 11, wherein each of ATM switches comprises:
a second routing table;
a second flow table for registering a flow of a series of layer-3 packets; and
a second controller for determining a transfer route from the connection setup message by referring to the second routing table, transmitting a connection setup message conveying the connection QOS to a next-hop node of the ATM network according to the transfer route to ensure a connection with the connection QOS dedicated to transfer of the series of packets to the next-hop node, and transferring the series of packets received from the upstream node to the next-hop node through the connection after the connection with the connection QOS has been set up.

13. The system according to claim 11, wherein the connection QOS is a connection setup priority, wherein a connection dedicated to transfer of the series of packets is set up for a flow given a higher connection setup priority.

14. A gateway interfacing between a non-ATM network and an ATM network composed of a plurality of ATM switches, comprises:

a routing table;

a flow table for registering a flow of a series of layer-3 packets;

a controller for determining whether a flow of the series of packets has been registered by referring to the flow table, determining a transfer route from a first packet of the series of packets by referring to the routing table when the flow has not been registered in the flow table, transmitting a connection setup message to a next-hop ATM switch of the ATM network according to the transfer route to ensure a connection dedicated to transfer of the series of packets, and transferring the series of packets received from the non-ATM network to the next-hop ATM switch through the connection after the connection has been set up; and said controller having received the connection setup message, (1) monitors the flow of the series of packets received through the connection, and (2) affects retention and release of said connection; and wherein said controller affects retention and release of said connection by: transmitting a connection retaining message to an upstream adjacent node using a default connection at intervals of a predetermined time period to retain the connection dedicated to transfer of the series of packets when it is determined that the flow continues, and transmitting a connection releasing message to the upstream adjacent node using the default connection to release the connection dedicated to transfer of the series of packets when it is determined that the flow is terminated.

15. The gateway according to claim 14, wherein when receiving the connection retaining message conveying identification information of an egress gateway, the controller determines whether a plurality of connections have the egress gateway by looking at the identification information of the connection retaining message, transmitting a connection setup message to the next-hop ATM switch to integrate the plurality of connections to produce a single connection to the egress gateway when the plurality of connections have the same egress gateway, and transferring the packets transferred through the plurality of connections to the next-hop ATM switch through the single connection after the single connection has been set up.

16. An ATM switch in an ATM network which is interfaced with a non-ATM network by a gateway, comprising:

a routing table;

a flow table for registering a flow of a series of layer-3 packets; and a controller for determining a transfer route from a connection setup message received from an upstream node by referring to the routing table, transmitting a connection setup message to a next-hop node of the ATM network according to the transfer route to ensure a connection dedicated to transfer of the series of packets to the next-hop node, and transferring the series of packets received from the upstream node to the next-hop node through the connection after the connection has been set up;

wherein when the connection to the next-hop node is not set up yet, the controller transfers the series of packets through a default connection to the next-hop node until the connection to the next-hop node has been set up.

17. A system comprising:

an ATM network composed of a plurality of ATM switches;

a first gateway interfacing between the ATM network and a first non-ATM network; and a second gateway interfacing between the ATM network and a second non-ATM network, wherein each of the first and second gateways comprises:

a first routing table;

a first flow table for registering a flow of a series of layer-3 packets;

a first controller for determining whether a flow of the series of packets has been registered by referring to the flow table, determining a transfer route from a first packet of the series of packets by referring to the routing table when the flow has not been registered in the flow table, registering the flow in the flow table, transmitting a connection setup message to a next-hop ATM switch of the ATM network according to the transfer route to ensure a connection dedicated to transfer of the series of packets, and transferring the series of packets received from the non-ATM network to the next-hop ATM switch through the connection after the connection has been set up; and wherein the first controller determines whether a flow of the series of packets has been registered by referring to the flow table, determining a transfer route from a first packet of the series of packets by referring to the routing table when the flow has not been registered in the flow table, registering the flow in the flow table with a required connection QOS (Quality of Service), transmitting a connection setup message conveying the connection QOS to a next-hop ATM switch of the ATM network according to the transfer route to ensure a connection with the connection QOS dedicated to transfer of the series of packets, and transferring the series of packets received from the non-ATM network to the next-hop ATM switch through the connection after the connection with the connection QOS has been set up.

18. The system according to claim 17, wherein each of ATM switches comprises:

a second routing table;

a second flow table for registering a flow of a series of layer-3 packets; and a second controller for determining a transfer route from the connection setup message by referring to the second routing table, transmitting a connection setup message conveying the connection QOS to a next-hop node of the ATM network according to the transfer route to ensure a connection with the connection QOS dedicated to transfer of the series of packets to the next-hop node, and transferring the series of packets received from the upstream node to the next-hop node through the connection after the connection with the connection QOS has been set up.

19. The system according to claim 17, wherein the connection QOS is a connection setup priority, wherein a connection dedicated to transfer of the series of packets is set up for a flow given a higher connection setup priority.

* * * * *